United States Patent [19]
Becherucci et al.

[11] Patent Number: 6,127,652
[45] Date of Patent: Oct. 3, 2000

[54] WIRE CHANGING IN AN ARMATURE WINDER

[75] Inventors: Antonio Becherucci; Rossano Galassi, both of Florence; Antonio Randazzo, Venice; Maurizio Mugelli; Gianfranco Stratico, both of Siena, all of Italy

[73] Assignee: Axis USA, Inc., Tampa, Fla.

[21] Appl. No.: 09/019,222

[22] Filed: Feb. 5, 1998

Related U.S. Application Data

[60] Provisional application No. 60/038,014, Feb. 14, 1997, and provisional application No. 60/055,138, Aug. 7, 1997.

[51] Int. Cl.$^7$ .................................................. B23K 11/00
[52] U.S. Cl. .................. 219/148; 219/145.1; 219/78.01; 219/56; 219/58
[58] Field of Search ................................ 219/148, 145.1, 219/78.01, 104, 57, 58, 106, 56; 242/551, 550, 570

[56] References Cited

U.S. PATENT DOCUMENTS

| | | | |
|---|---|---|---|
| 1,475,855 | 11/1923 | Murdock . | |
| 3,326,436 | 6/1967 | Huck | 226/25 |
| 3,745,230 | 7/1973 | Kelly | 174/103 |
| 3,927,469 | 12/1975 | Dammar | 29/597 |
| 3,980,859 | 9/1976 | Leonard | 219/104 |
| 4,388,952 | 6/1983 | Hamane et al. | 140/92.1 |
| 4,650,131 | 3/1987 | Droll et al. | 242/7.03 |
| 5,257,745 | 11/1993 | Lombardi et al. | 242/7.05 B |
| 5,310,124 | 5/1994 | Linari et al. | 242/7.05 B |

FOREIGN PATENT DOCUMENTS 0 332 589 A1  8/1989  European Pat. Off. ....... H02K 15/04

*Primary Examiner*—Patrick Ryan
*Assistant Examiner*—M. Alexandra Elve
*Attorney, Agent, or Firm*—Fish & Neave; Robert R. Jackson; James A. Leiz

[57] ABSTRACT

Methods and apparatus for replacing an old wire threaded through a flyer winder with a new wire are provided. A first end of the old wire is connected to a first end of the new wire. The wires may be connected by twining, clamping, welding or the like. A second end of the old wire that extends from one of the winder's flyers is then connected to a collection device, and the old wire is collected until the new wire has been threaded through the flyer winder along the same path traveled by the old wire. The collection device may be an armature or similar structure having recesses for collecting the old wire during wire change-over or replacement. Preferably the collection device is configured so that conventional coil lead connection operations may be used to expedite wire change-over or replacement.

15 Claims, 7 Drawing Sheets

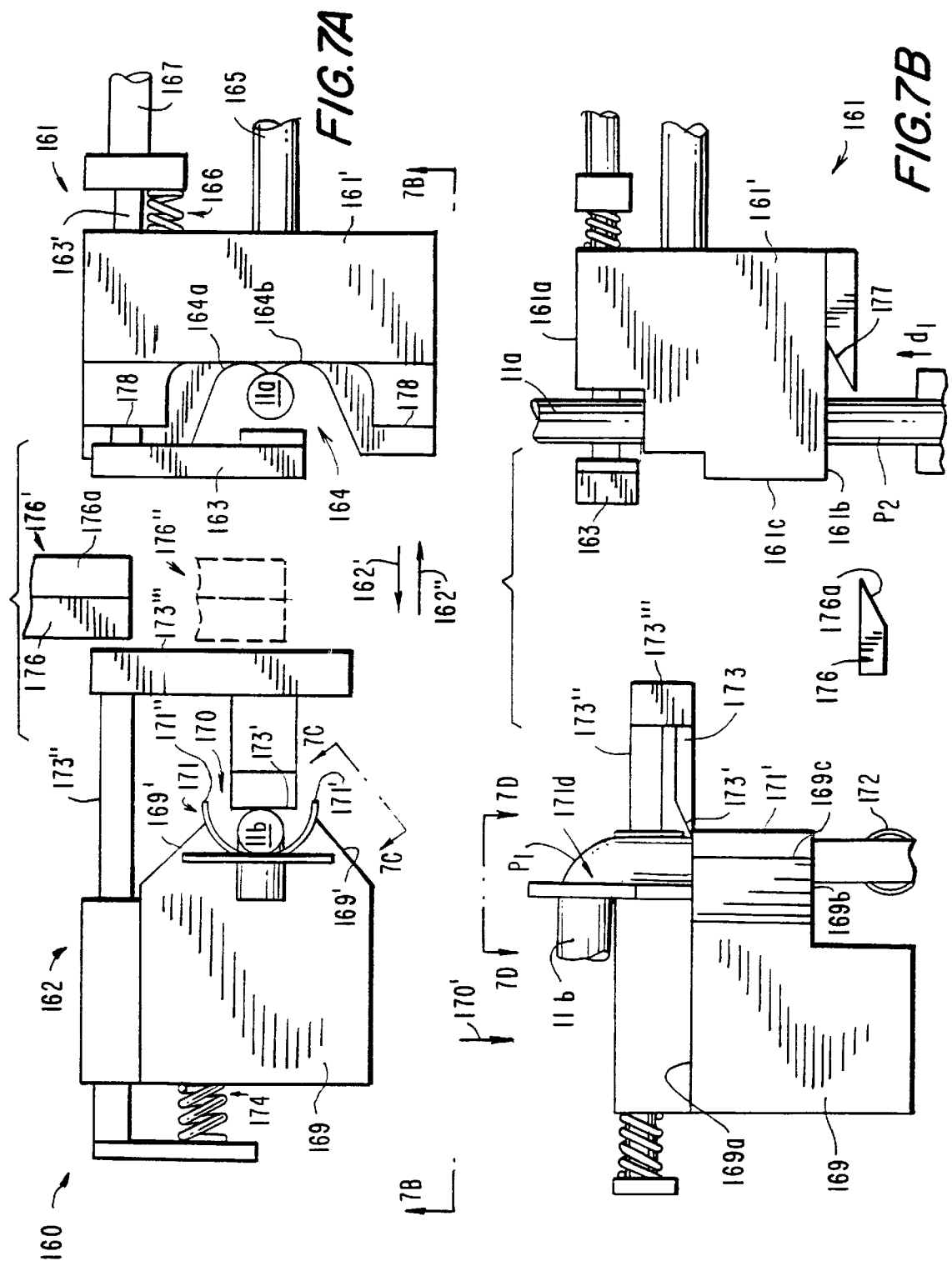

WIRE CHANGING IN AN ARMATURE WINDER

This application claims the benefit of U.S. provisional applications No. 60/038,014, filed Feb. 14, 1997, and No. 60/055,138, filed Aug. 7, 1997.

BACKGROUND OF THE INVENTION

The present invention concerns improving the performance of a conventional double flyer winder used for winding coils of wire in the slots of an electric motor armature. Conventional winders of this type where the invention can be applied are described in U.S. Pat. No. 3,927,469.

The present invention is directed to improving the operations of these winders, particularly when the wires used to wind the armature coils need to be changed. Such a wire change is required whenever wire disposed between a wire supply spool and one or more of the flyer winder's flyers lacks the specifications required for winding a subsequent type of armature (e.g., when a subsequent armature requires a different wire diameter or some other wire property). This situation is often referred to as the "change-over" of the winder, and may also be required for other aspects of the winding operation such as wire guide changing and commutator sleeve changing.

During wire change-over, new spools having wires of the required specification are substituted for the wire spools currently feeding the flyer winder's flyers. Accordingly, each new wire is manually threaded from its new wire spool through the winder to its respective flyer. A similar manual threading operation is performed when a wire spool being used to wind armatures runs out of wire and the spool must be replaced by a new spool having wire with the same specifications. This situation is often referred to as spool "replacement."

When either wire change-over or spool replacement is performed for a conventional double flyer winder, rotation of the winder's flyers must be halted, the previously wound armature must be removed, and the new wires must be manually threaded through the many components of the winder. Such manual threading is time consuming and inefficient, and significantly reduces the productivity of conventional double flyer winders. Accordingly, a need exists for methods and apparatus that allow wire change-over and spool replacement to be quickly and efficiently performed within a flyer winder.

It is therefore an object of this invention to provide methods and apparatus that allow wire change-over and spool replacement to be quickly and efficiently performed within a double flyer winder. These methods and apparatus significantly increase the productivity of such winders.

SUMMARY OF THE INVENTION

These and other objects of the present invention are accomplished in accordance with the invention by providing methods and apparatus that allow wire change-over and spool replacement to be quickly and efficiently performed within a flyer winder. A first end of a wire currently threaded through the flyer winder (i.e., and old wire) is coupled to a first end of a new wire that is to replace the old wire. The first end of the old wire is preferably near a first spool of wire that supplies the flyer winder with the old wire. The first end, therefore, may be provided by cutting the old wire near the first spool.

A second spool of wire containing the new wire and having the first end of the new wire extending therefrom is provided. The first end of the new wire is then connected to the first end of the old wire. The two wires may be connected by twining the first end of the old wire about the first end of the new wire, by clamping the first end of the old wire to the first end of the new wire and passing an electric current through the clamped wires to produce a thermo-compression connection, or by deforming a deformable sheath about the wire ends. Other similar techniques may be employed.

Once the first ends of the old and new wires are connected together, a second end of the old wire (e.g., the end of the old wire that extends from one of the winder's flyers) is connected to a collection device. The collection device may be an armature or some other structure having recesses for collecting the old wire. The recesses of the collection device serve as depositories for the old wire by collecting the old wire as the winder's flyers are rotated. In this manner, the normal operation of the flyer winder may be used to collect the old wire and thread the new wire through the winder during wire change-over and replacement. In both cases, the winding of the flyers is halted when the old-to-new wire connection has been wound about the collection device. Following collection, the new wire is cut near the collection device and the collection device is removed. Being threaded with the new wire, the flyer winder is ready for winding armatures with the new wire.

In a preferred embodiment the collection device comprises a rotatable hooking drum that allows normal armature lead connection operations to be used during wire change-over or wire replacement. For instance, the second end of the old wire may be coupled to the hooking drum prior to wire collection by employing a normal winding lead connection operation. A winding lead connection operation similarly may be used to couple the freshly cut end of the new wire to the hooking drum once the new wire has been threaded through the flyer arm and cut free from the collection device.

Further features of the invention, its nature and various advantages, will be more apparent from the accompanying drawings and the following detailed description of the preferred embodiments.

BRIEF DESCRIPTION OF THE DRAWINGS

FIG. 7A is a top plan view of a preferred embodiment for connecting an old wire to a new wire via a deformable sheath within the double flyer winder of FIG. 1;

FIG. 7B is a side plan view of the deformable sheath connection device of FIG. 7A taken along line 7B—7B;

DETAILED DESCRIPTION OF THE PREFERRED EMBODIMENTS

Figure 1:
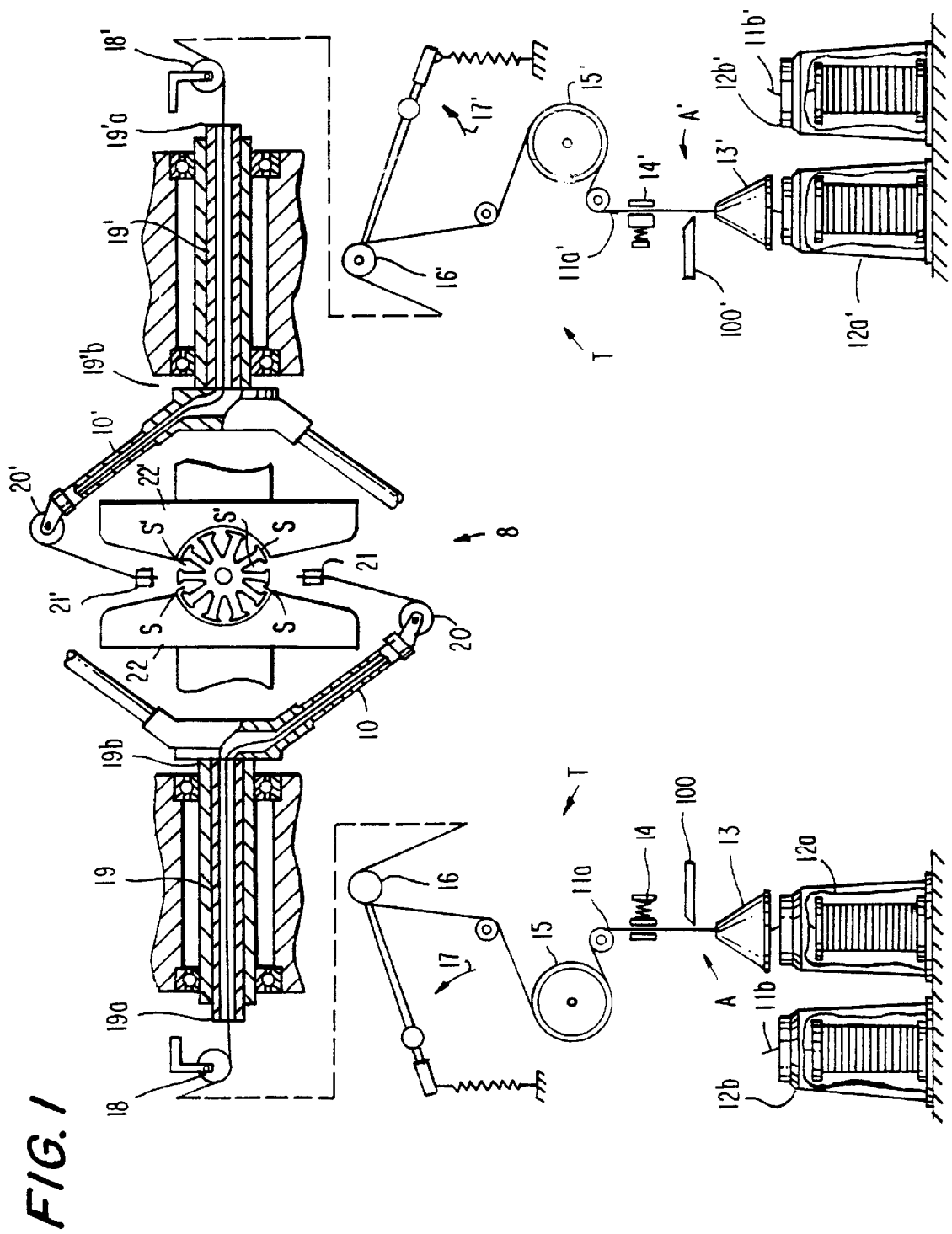
FIG. 1 is a side elevational view, in partial cross section, of a double flyer winder employing the present invention.

FIG. 1 is a side elevational view, in partial cross section, of a double flyer winder 8 for winding an armature 9 wherein the present invention may be applied. In the illustrative embodiment of FIG. 1, the travel paths of a first wire 11a and a second wire 11a' used to wind armature 9 are shown. First and second wires 11a and 11a' are drawn by rotation of their respective delivery flyers, first delivery flyer 10 and second delivery flyer 10'. First wire 11a forms coils on the left side of armature 9 in slots S by rotation of first flyer 10, while second wire 11a' forms coils on the right side of armature 9 in slots S' by rotation of second flyer 10'.

First and second wires 11a and 11a' come from a first stationary spool 12a and a second stationary spool 12a', respectively. First and second stationary spools 12a and 12a' have a first funnel 13 and a second funnel 13', respectively, that direct first and second wires 11a and 11a' to a first brake pad 14 and a second brake pad 14', respectively. Following first and second brake pads 14 and 14', first and second wires 11a and 11a' are directed to and wound around a first pulley wheel 15 and a second pulley wheel 15', respectively. First pulley wheel 15 and second pulley wheel 15' are each connected to a respective variable drag brake (not shown).

First and second wires 11a and 11a' then travel to a third pulley wheel 16 and a fourth pulley wheel 16', respectively, mounted on a first damped dancer arm arrangement 17 and a second damped dancer arm arrangement 17', respectively. From third and fourth pulley wheels 16 and 16' of first and second dancer arms 17 and 17', first and second wires 11a and 11a' travel to a fifth pulley wheel 18 and a sixth pulley wheel 18', respectively, where they are directed through a first inlet 19a of a first rotatable hollow shaft 19 and through a second inlet 19' of a second rotatable hollow shaft 19' respectively. Note that components with reference numerals 14, 15, 16 and 17 form a first tensioner T for first wire 11a, and components with reference numerals 14', 15', 16' and 17' form a second tensioner T' for second wire 11a'. First and second tensioners T and T' maintain first and second wire 11a and 11a' at a correct tension during armature winding. An example of a tensioner of this type has been presented in commonly assigned U.S. Pat. No. 5,310,124.

At an opposite side 19b of first hollow shaft 19 and at an opposite side 19b' of second hollow shaft 19', first and second wires 11a and 11a' exit each hollow shaft and travel to first and second flyer arms 10 and 10', respectively, to reach a seventh pulley wheel 20 and an eighth pulley wheel 20'. Seventh and eighth pulley wheels 20 and 20' are mounted on the outermost radial end of first and second flyer arms 10 and 10', respectively.

When double flyer winder 8 is not operating to wind an armature, but is prepared and waiting to do so as shown in FIG. 1, first and second wires 11a and 11a' coming from seventh and eighth pulley wheels 20 and 20' are held by a first gripper 21 and a second gripper 21', respectively. How these grippers cooperate with first and second flyers 10 and 10' and other tooling that allows double flyer winder 8 to start, continue, and end winding of coils is discussed in previously referenced U.S. Pat. No. 3,927,469.

During winding, the running wires (e.g., first and second wires 11a and 11a') being delivered to armature 9 span between seventh and eighth pulley wheels 20 and 20' (of the rotating first and second flyers 10 and 10') and a first slot S and a second slot S' of the armature where the coils are being formed.

In a winder without the application of the present invention, change-over or replacement of first and second wires 11a and 11a' requires stopping the rotation of first flyer 10 and second flyer 10', unloading from the winder the previously wound armature and manually threading new wires from a first new wire spool 12b and a second new wire spool 12b' along the paths from the new wire spools all the way to first and second grippers 21 and 21', respectively. This manual operation is very inefficient and time consuming.

During a manual wire change-over or wire replacement operation, a "service wire" (not shown) is threaded by hand through either first and second flyer arms 10 and 10' (the same service wire is used at different times depending on which of first wire 11a and second wire 11a' is being changed) starting at either seventh pulley wheel 20 or eighth pulley wheel 20'. The service wire is then fed into opposite side 19b or opposite side 19b' (of first hollow shaft 19 or second hollow shaft 19'), so that the service wire exits first inlet 19a or second inlet 19a'. The end of the service wire exiting inlet 19a or 19a' is then manually tied to either new first wire 11b or new first wire 11b' (depending on which flyer is being threaded) which has been previously threaded all the way from new first spool 12b or new second spool 12b' to fifth pulley wheel 18 or sixth pulley wheel 18'.

After manual connection has been made between the service wire and the new wire, the service wire is pulled back through either first hollow shaft 19 or second hollow shaft 19' and through the first flyer 10 or second flyer 10' until the new wire exits at seventh pulley wheel 20 or eighth pulley wheel 20'. The new wire then can be untied from the service wire and placed in either first gripper 21 (if first flyer 10 is threaded) or second gripper 21' (if second flyer arm 10' is threaded).

Absent the present invention, the time consuming operations required to change wires in a flyer winder significantly increase a winder's "down time" during wire change-over or wire replacement and translate into a loss in winder productivity. As described below, the present invention reduces the time required to change a wire during wire change-over or wire replacement, and thus increases the productivity of the winder.

To change wires in accordance with the principles of the invention, the operation of double flyer winder 8 must be halted (e.g., first and second flyers 10 and 10' must be stationary and first and second wires 11a and 11a' should be held by first gripper 21 and second gripper 21', respectively), as shown in FIG. 1. This is a normal situation in conventional winders which presents itself when an armature has been completely wound and when the wound armature needs to be replaced with an unwound armature requiring winding with a new wire.

At this point, with first and second wires 11a and 11a' in first and second grippers 21 and 21', respectively, wound armature 9 is unloaded by moving apart a first wire guide 22 and a second wire guide 22' that surround wound armature 9, and by withdrawing wound armature 9 from winder 8 with a load/unload device (not shown). First and second wires 11a and 11a' (which are threaded through first and second flyers 10 and 10', respectively, and which need to be changed) are then cut by means of a first cutter 100 and a second cutter 100', respectively, present in Areas A and A' of FIG. 1 (e.g., Area A being between first spool 12*a* and first brake pad 14, and Area A' being between second spool 12*a*' and second brake pad 14').

When first and second wires 11*a* and 11*a*' are cut, they will not slacken because they are held between first gripper 21 and first brake pad 14 and between second gripper 21' and second brake pad 14', respectively. After being cut by first and second cutters 100 and 100', the leading end of new first wire 11*b* (coming from new first spool 12*b* which is to be substituted for old first spool 12*a*) and the leading end of new second wire 11*b*' (coming from new second spool 12*b*' which is to be substituted for old second spool 12*a*') are connected, either manually or with automatic devices (described below), to the ends of old first and second wires 11*a* and 11*a*', respectively. The connection between new first wire 11*b* and old first wire 11*a*, and the connection between new second wire 11*b*' and old second wire 11*a*' occur in areas A and A', respectively.

Figure 2:
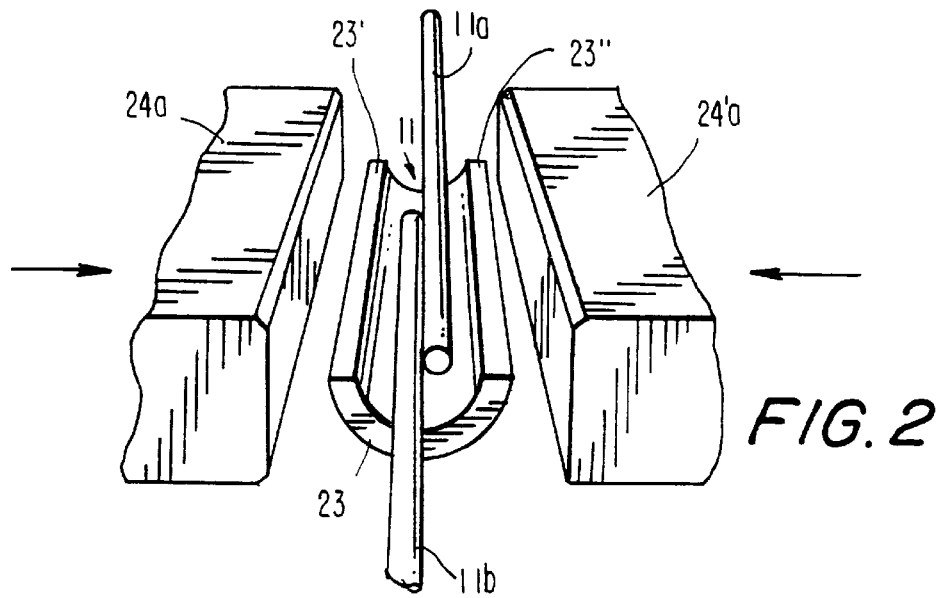
FIG. 2 is a perspective view of a first embodiment for connecting an old wire to a new wire within the double flyer winder of FIG. 1.
Figure 3:
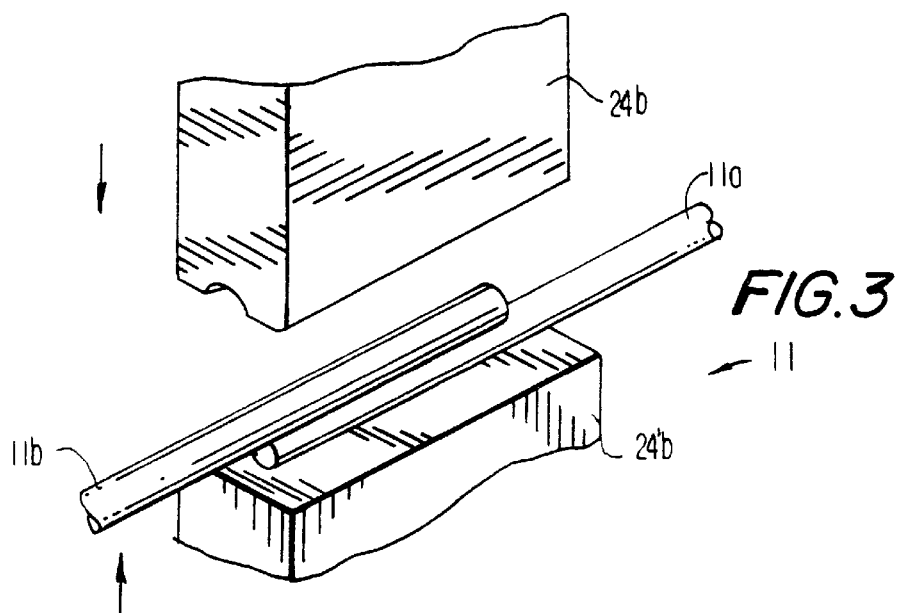
FIG. 3 is a perspective view of a second embodiment for connecting an old wire to a new wire within the double flyer winder of FIG. 1.
Figure 4:
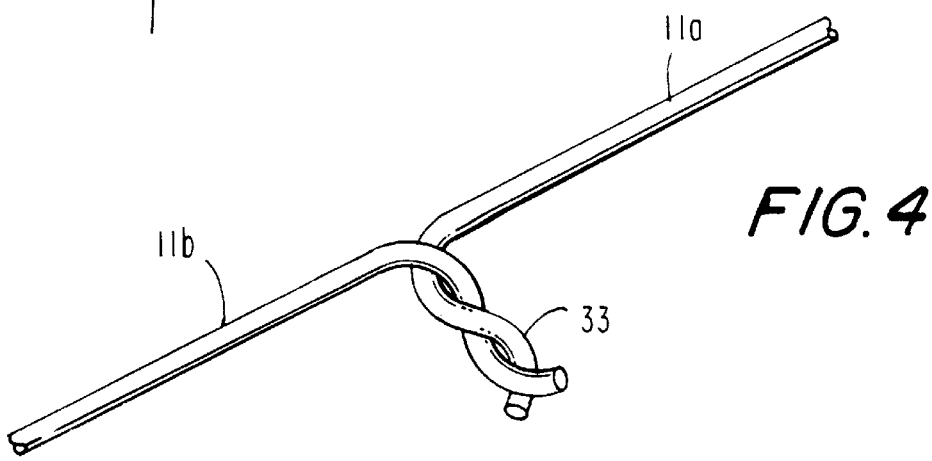
FIG. 4 is a perspective view of a third embodiment for connecting an old wire to a new wire within the double flyer winder of FIG. 1.

Alternative embodiments for carrying out the connection of new first wire 11*b* to old first wire 11*a* and new second wire 11*b*' to old second wire 11*a*' are shown in FIGS. 2–4. For convenience, only the connection of new first wire 11*b* to old first wire 11*a* will be described for each embodiment in FIGS. 2–4 as the connection of new second wire 11*b*' to old second wire 11*a*' is identically performed.

In the first embodiment shown in FIG. 2, an end of old first wire 11*a* is placed adjacent an end of new first wire 11*b* within a deformable sheath 23 so as to form a first wire pair 11. Deformable sheath 23 has a first deformable wall 23' and a second deformable wall 23" that may deform to clamp together wire pair 11 as described below.

Once old and new first wires 11*a* and 11*b* are aligned within sheath 23, sheath 23 is placed between a first deforming member 24*a* and second deforming member 24*a*'. First and second deforming members 24*a* and 24*a*' are then pressed together to deform first and second deformable walls 23' and 23" of sheath 23 toward one another and around wire pair 11 in order to clamp old and new first wires 11*a* and 11*b* firmly together. A preferred embodiment for forming a deformable sheath connection is described below with reference to FIGS. 7A–7D.

A second embodiment for connecting the ends of old first wire 11*a* and new first wire 11*b* is shown in FIG. 3 wherein a first electrode 24*b* and a second electrode 24*b*' are placed on either side of aligned wire pair 11. Wire pair 11 is then clamped together with a predetermined pressure by clamping together first and second electrodes 24*b* and 24*b*'. A current is then passed through the clamped electrodes, so that a thermo-compression connection forms between and firmly connects old first wire 11*a* and new first wire 11*b*.

A third embodiment for connecting the ends of old first wire 11*a* and new first 11*b* (or the ends of old second wire 11*a*' and new second wire 11*b*') is shown in FIG. 4. In this case, the two wire ends are twined together to form a connection 33. Old and new first wires 11*a* and 11*b* may be twined together manually, via automatically operated pliers, or with other similar means.

Figure 5:
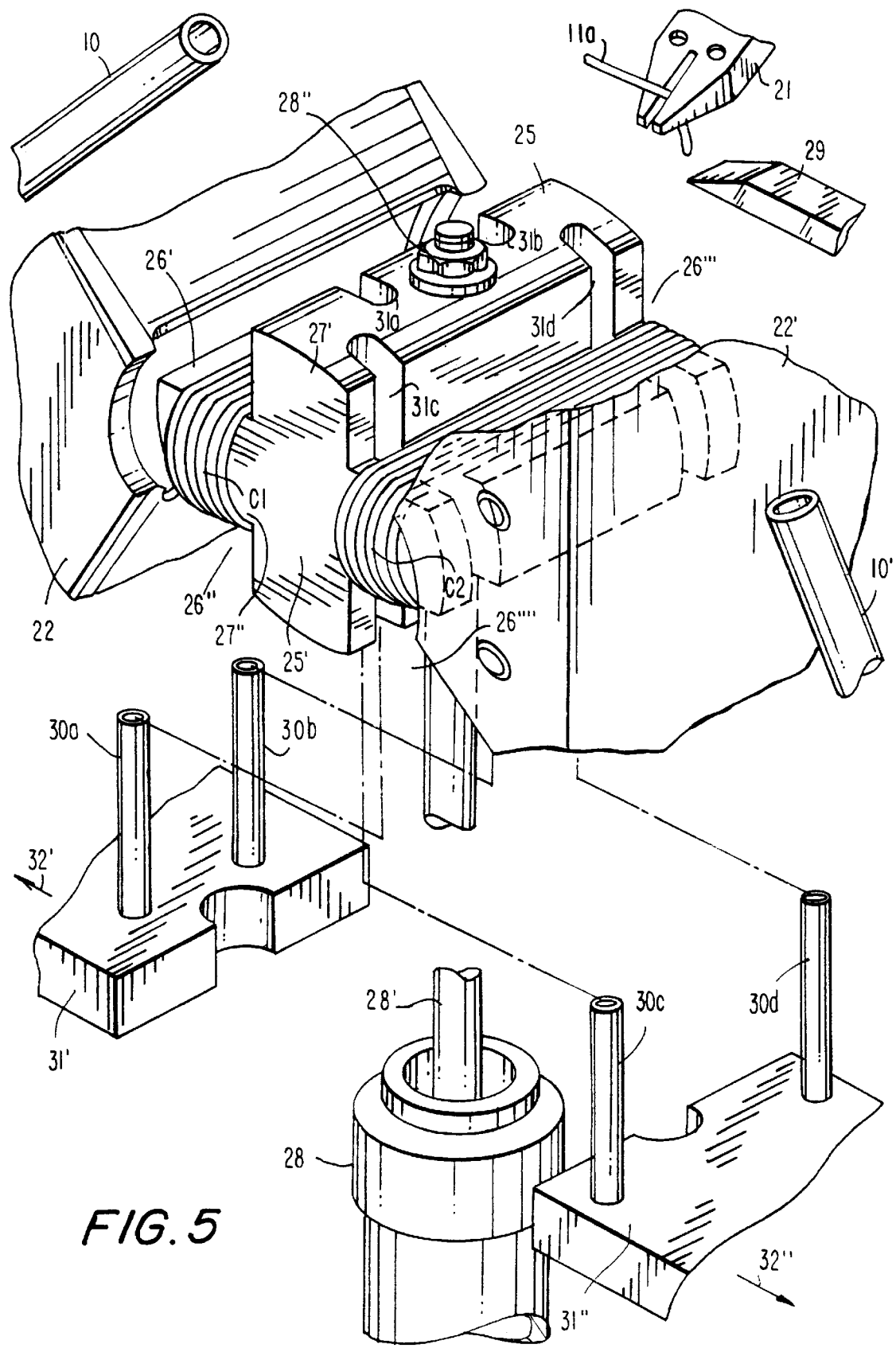
FIG. 5 is a perspective view of a first collection device for performing wire change-over or wire replacement within the double flyer winder of FIG. 1.

At the same time or soon after old and new first wires 11*a* and 11*b* and/or old and new second wires 11*a*' and 11*b*' are being connected in areas A and/or A', a collection device 25 (shown in FIG. 5) can be positioned between first and second guides 22 and 22'. As shown in FIG. 5, collection device 25 has a first recess 26', a second recess 26", a third recess 26'" and a fourth recess 26"" formed between a first radially extending portion 27' (vertical portion) and a second radially extending portion 27" (horizontal portion). To control the height of collection device 25, an air cylinder 28 couples collection device 25 via a stem 28'. A first end of the stem 28' is connected to the air cylinder 28 and a second end of the stem 28' is connected to collection device 25 by means of a bolt 28".

By actuating air cylinder 28 (e.g., by increasing the air pressure in air cylinder 28), collection device 25 is raised from a position below first and second guides 22 and 22' (e.g., from a rest position located out of the way of first and second flyers 10 and 10' during winding) to a position between first and second winding guides 22 and 22' as shown in FIG. 5. Once collection device 25 is positioned between these first and second guides 22 and 22', first and second guides 22 and 22' are moved toward each other so that the recesses 26', 26", 26'", and 26"" are aligned to receive wire delivered by rotation of first and second flyers 10 and 10'. First and second recesses 26' and 26" are configured to receive a coil (C1) of wire wound by rotating first flyer 10 (shown broken in FIG. 5), while third and fourth recesses 26'" and 26"" are configured to receive a coil (C2) of wire wound by rotating second flyer 10' (also shown broken in FIG. 5). FIG. 5 shows wire coils C1 and C2 already wound on horizontal portions 27" of collection device 25 with their respective recesses 26', 26" and 26'", 26"".

After new first and second wires 11*b* and 11*b*' have been connected (e.g., by one of the connection devices shown in FIG. 2, 3 or 4) to the ends of old first and second wires 11*a* and 11*a*' (e.g., the wires to be changed) and after collection device 25 has been positioned in alignment with first and second guides 22 and 22' (FIG. 5), the completion of wire-change-over or wire replacement occurs by rotating first and second flyers 10 and 10'. The rotation of first and second flyers 10 and 10' for a predetermined number of revolutions draws new first and second wires 11*b* and 11*b*' through the paths previously traveled by old first and second wires 11*a* and 11*a*' in order to reach respective first and second grippers 21 and 21'.

The rotation of first and second flyers 10 and 10' is halted when the new-wire-to-old-wire connection points (e.g., old first wire 11*a* to new first wire 11*b* and old second wire 11*a*' to new second wire 11*b*') produced in areas A and A' (FIG. 1) are wound on collection device 25. Once this condition has been reached, first and second grippers 21 and 21' (not shown in FIG. 5) move to grip respective portions of new first and second wires 11*b* and 11*b*' that extend between first and second flyers 10 and 10' and wire coils C1 and C2 wound on collection device 25. Once first and second grippers 21 and 21' have gripped their respective wire and have returned to a retracted position (such as is shown in FIG. 5), a first cutter device 29 and a second cutter device 29' (not shown in FIG. 5) cut new first and second wires 11*b* and 11*b*' extending from coils C1 and C2 to first and second grippers 21 and 21'. The new first and second wires 11*b* and 11*b*' are preferably cut very close to first and second grippers 21 and 21', respectively.

At this point, flyer winder 8 with new first and second wires 11*b* and 11*b*' stretched from first and second flyers 10 and 10' to first and second grippers 21 and 21', respectively, is ready to wind a new armature as coils C1 and C2 have been freed from new first and second wires 11*b* and 11*b*'. Collection device 25 is then lowered to its rest position (not shown).

Preferably, as collection device 25 is lowered, a plurality of expulsion pins 30*a–d* align with and seat themselves in a plurality of respective seats 31*a–d* of collection device 25.

Expulsion pins 30 are preferably four in number, with expulsion pins 30a and 30b located on a first board slide 31' and expulsion pins 30c and 30d located on a second board slide 31". Expulsion pins 30a and 30b insert into seats 31a and 31b of collection device 25, and expulsion pins 30c and 30d insert into seats 31c and 31d of collection device 25. When expulsion pins 30a–d are located within seats 31a–d, expulsion pins 30a–b are disposed between the center 25' of collection device 25 and coil C1, and expulsion pins 30c–d are disposed between the center 25' of collection device 25 and coil C2.

Once expulsion pins 30a–d are located within their respective seats 31a–d (e.g., after collection device 25 has been lowered) first and second board slides 31' and 31" are moved in directions 32' and 32", respectively. This movement causes expulsion pins 30a–d to drag wire coils C1 and C2 off extending horizontal portions 27" of collection device 25 so that coils C1 and C2 fall into a waste collector (not shown). Expulsion pins 30a–d are then returned to their previous position within seats 31a–d by moving board slides 31' and 31" toward one another. Collection device 25 then may be used to change the wires of flyer winder 8 when wire change-over or wire replacement is once again required.

As a first alternative to collection device 25, a new unwound armature (not shown) may be inserted between first and second winding guides 22 and 22' instead of collection device 25. Coils C1 and C2 of the wire withdrawn from flyer winder 8 then can be wound in slots of the new unwound armature. In this situation, the operations of first and second flyers 10 and 10', first and second grippers 21 and 21', and first and second cutting devices 29 and 29' that form and free coils C1 and C2 from first and second grippers 21 and 21' are identical to the previously described operations used for collection device 25. Once coils C1 and C2 have been wound on the armature and freed from first and second grippers 21 and 21', the armature can be unloaded from flyer winder 8 and placed in a location usually occupied by rejected armatures. Coils C1 and C2 then can then be manually removed from the armature.

Figure 6A:
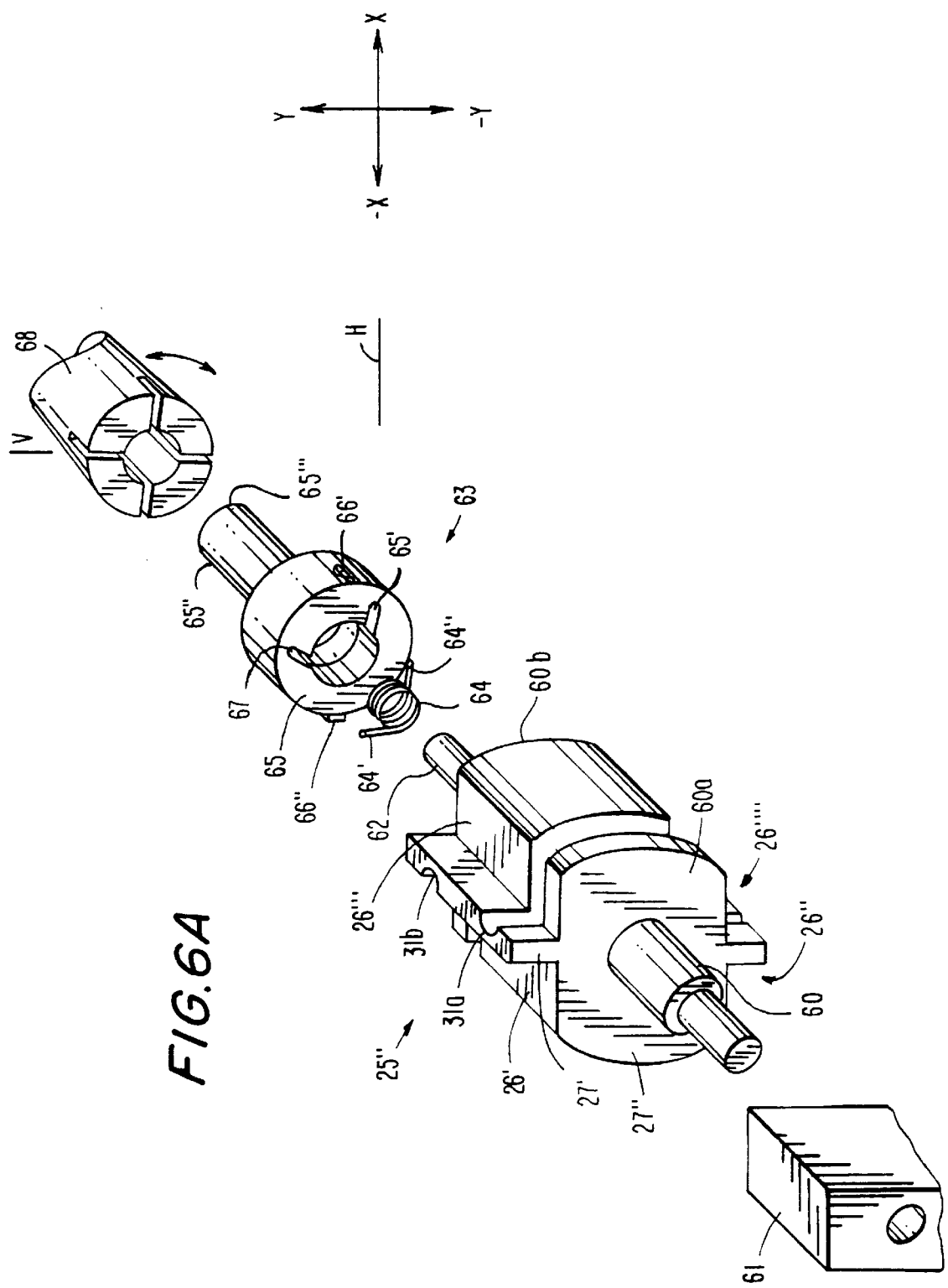
FIG. 6A is a perspective view of a second collection device for performing wire change-over or wire replacement within the double flyer winder of FIG. 1.

FIG. 6A shows a second alternative to the collection device 25 of FIG. 5. FIG. 6A shows a perspective view of a collection device 25" having first, second, third and fourth recesses 26', 26", 26''', and 26'''', vertical portions 27', horizontal portions 27" and seats 31a–b. Because of the similarities between collection device 25 and collection device 25", like numerals will be used herein when possible. Note that while only two seats are shown, more may be employed.

Collection device 25" is provided with a first shaft portion 60 extending from its front face 60a. In substitution of air cylinder 28 (FIG. 5), collection device 25" has a collet mechanism 61 that grips shaft portion 60 to lift and lower collection device 25" so as to position it with respect to first and second wire guides 22 and 22'. Collet mechanism 61 allows collection device 25" to be quickly removed and exchanged with another collection device 25" that better suits flyer winder 8 (not shown) following any armature size conversion which may take place in winder 8.

A rearward face 60b of collection device 25" has a second shaft portion 62 for receiving a hooking assembly 63. Hooking assembly 63 comprises a spiral spring 64 having a first end 64' and a second end 64", and a hooking drum 65. When hooking assembly 63 is assembled, spiral spring 64 surrounds second shaft portion 62, first end 64' engages against an abutment surface (not shown) of rearward face 60b, and second end 64" engages a side slot 65' machined in hooking drum 65. Hooking drum 65 is cylindrical in shape and has a rearward cylindrical shaft 65" that further accommodates second shaft portion 62.

As shown in FIG. 6A, spiral spring 64 and hooking drum 65 are aligned with second shaft portion 62 prior to being assembled. Because hooking drum 65 is cylindrical in shape and is hollow, it can receive both second shaft portion 62 and spiral spring 64 when these components are assembled.

A seeger fastener ring (not shown) is coupled to second shaft portion 62 and engages against an end face 65''' of rearward cylindrical extension 65" (of hooking drum 65) to maintain spiral spring 64 and hooking drum 65 assembled on second shaft portion 62. The tolerances with which hooking drum 65 fits on second shaft portion 62 are such that hooking drum 65 can be easily rotated on second shaft portion 62. Hooking drum 65 is further provided with a first tang 66' and a second tang 66" that are diametrically opposite one another.

When hooking drum 65 is assembled on second shaft portion 62, spiral spring 64 is slightly pre-loaded (e.g., compressed) so that a stop 67 of hooking drum 65 is maintained in engagement with an abutment surface (not shown) of rearward face 60b of collecting device 25". In this way first and second tangs 66' and 66" are maintained in horizontal position H (e.g., at approximately a three or a nine o'clock position, or along the ±X-axis) for reasons which will be explained below.

Collection device 25" is used to receive wire coils C1 and C2 from first and second flyers 10 and 10' of winder 8 in a manner similar to collection device 25 of FIG. 5. With collection device 25", the final leads (e.g., one of the ends of each coil) of coils C1 and C2 can be connected to first and second tangs 66' and 66" and cut therefrom in the same manner that the final leads of coils of a wound armature are connected to the tangs of a commutator and cut therefrom by traditional techniques and apparatus.

With reference to FIG. 6A, during the operation of collection device 25", the leads of coils C1 and C2 (not shown) are connected to first and second tangs 66' and 66", respectively, of hooking drum 65. It is assumed that new first and second wires 11b and 11b' have been previously connected to old first and second wires 11a and 11a' in areas A and A' as previously described. While hooking drum 65 is in position H, connection to first and second tangs 66' and 66" is accomplished by rotation of first and second flyers 10 and 10' and with the use of hooking plates (not shown) which are part of first and second winding guides 22 and 22', just as a connection is conventionally performed during the connection of the final coil leads of an armature to the tangs of a commutator.

The rotation of first and second flyers 10 and 10' for a predetermined number of revolutions is then performed to draw new first and second wires 11b and 11b' through the paths previously traveled by old first and second wires 11a and 11a'. As previously described, first and second flyers 10 and 10' are rotated until the new wire to old wire connection points are wound on collection device 25" and coils C1 and C2 are formed. Following winding, an indexing gripper 68 of winder 8 (usually used to hold an armature during winding operations) grips rearward extension 65" and rotates hooking drum 65 so that first and second tangs 66' and 66" reach vertical position V (twelve or six o'clock position, or align along the ±Y axis). During the rotation of hooking drum 65, spiral spring 64 becomes even more loaded. In position V, first and second grippers 21 and 21' of winder 8 can grasp new first and second wires 11b and 11b' which extend from first and second flyers 10 and 10', just like they would do during the termination of final leads of an armature being wound. Following lead connection, collection device 25" is cut free by means of cutters 29 and 29' (FIG. 5) or by tearing first and second wires 11*b* and 11*b'* against first and second tangs 66' and 66" by means of a pulling motion from first and second grippers 21 and 21'. Even the operation of cutting or tearing wires is identical to the conventional operations used in flyer winders to free an armature following a winding operation.

After cutting the leads to free collection device 25", indexing gripper 68 releases rearward extension 65" so that hooking drum 65 can rotate to bring first and second tangs 61 and 61' back to position H due to the loading of spiral spring 64.

Collection device 25" is then lowered away from first and second winding guides 22 and 22' to remove coils C1 and C2, and winder 8 is ready to start winding a new armature in the necessary condition of having wire extending from first and second grippers 21 and 21' to first and second flyers 10 and 10'.

Figure 6B:
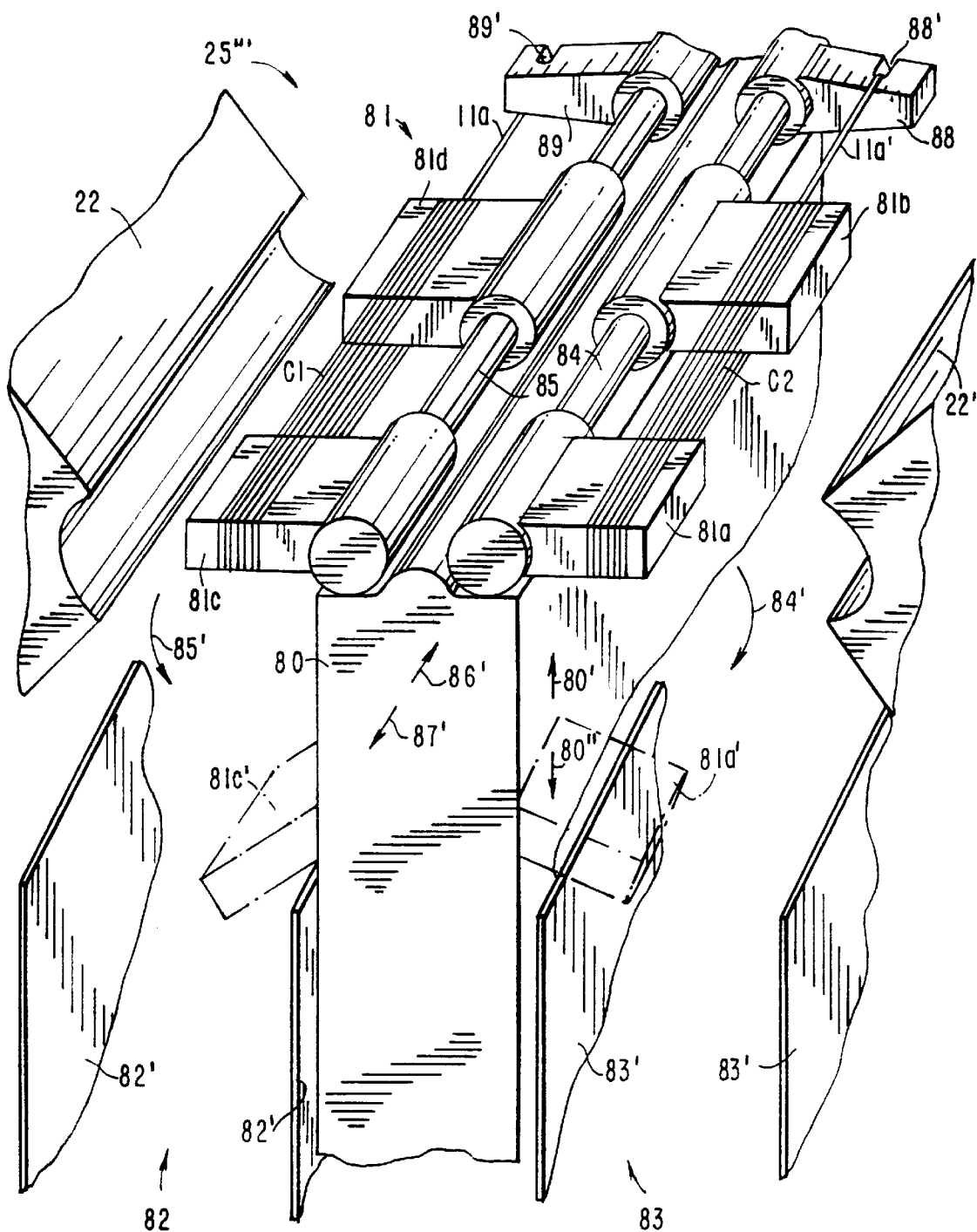
FIG. 6B is a perspective view of a third collection device for performing wire change-over or wire replacement within the double flyer winder of FIG. 1.

FIG. 6B shows a third alternative to the collection device 25 of FIG. 5. FIG. 6B shows a perspective view of a collection device 25''' having a central column 80 connected to a collector portion 81. Central column 80 can move in a first vertical direction 80' or in a second vertical direction 80", respectively, to present collector portion 81 between the armature winder's winding guides 22 and 22', or to bring collector portion 81 near waste compartments 82 and 83. The waste compartments are delimited, respectively, by side walls 82' and 83'. Central column 80 passes between waste compartments 82 and 83 as shown in FIG. 6B.

Collector portion 81 is provided with fins 81*a* and 81*b*, mounted on a shaft 84, and fins 81*c* and 81*d*, mounted on a shaft 85. Fins 81*a* and 81*b* are capable of rotating in a direction 84' (e.g., clockwise) around shaft 84 in order to pass from the horizontal position (shown solid in FIG. 6B) to an inclined position (shown by a dash line representation 81*a'*). Similarly fins 81*c* and 81*d* are capable of rotating in direction 85' (e.g., counter clockwise) around shaft 85 in order to pass from the horizontal position (shown solid) to an inclined position (shown by a dash line representation 81*c'*. Fins 81*a* and 81*b* are also capable of translating in a first horizontal direction 86' (parallel to the longitudinal extension of shafts 84 and 85) to bring fins 81*a* and 81*b* closer together (not shown), and in a second horizontal direction 87' to bring fins 81*a* and 81*b* back to the position shown in FIG. 6B. Similarly, fins 81*c* and 81*d* are capable of translating in direction 86', to bring the fins closer together, and in direction 87' to separate fins 81*c* and 81*d*. In addition to fins 81*a–d*, shafts 84 and 85 are provided with a first ledge 88 and a second ledge 89, respectively.

The collector device 25''', as shown in FIG. 6B, is in a condition for receiving coils C1 and C2 of old wires 11*a* and 11*a'* from the flyers 10 and 10', with the aid of winding guides 22 and 22'. (Note that for clarity, the winding guides 22 and 22' are shown farther apart than they would be during coil formation.) In practice, the central recesses of the winding guides 22 and 22' actually receive fins 81*a*, 81*b*, 81*c* and 81*d* so that the old wires 11*a* and 11*a'* leaving the flyers 10 and 10' (FIG. 1) can be deposited as coils C1 and C2 as shown in FIG. 6B. First and second ledges 88 and 89 are used as reference surfaces for laying the leads of the coils C1 and C2 by means of the flyer rotation. The leads are drawn into notches 88' and 89' of ledges 88 and 89, respectively, (to prevent the leads from sliding off the ledges), before the performance of the gripping and cutting operations required to restore the winder for winding with the new wire.

Once the coils C1 and C2 have been wound on fins 81*a*–81*d*, central column 80 is lowered, the fins 81*a*–81*d* are translated in direction 86' to bring them closer together, and shafts 84 and 85 are rotated in directions 84' and 85', respectively. After these movements, the coils C1 and C2 are no longer tensioned on fins 81*a*–81*d* and thereafter fall into waste compartments 82 and 83. Because collector device 25''' is provided with fins 81*a*–81*d* that can fit into a variety of differently sized recesses (e.g., recesses formed by using smaller or larger winding guides), collector device 25''' is universal in the sense that it need not be changed when the winder is converted for winding a differently sized armature.

FIG. 7A is a top plan view of a preferred connection device 160 for connecting the old first wire 11*a* to the new first wire 11*b* and the old second wire 11*a'* to the new second wire 11*b'*. Only the connection of the new first wire 11*b* to the old first wire 11*a* is described herein. It will be understood that the new second wire 11*b'* may be similarly connected to the old second wire 11*a'* with the connection device 160.

The connection device 160 may be used with a flyer winder, such as the double-flyer winder 8 of FIG. 1, or with any other coil winder. Preferably the connection device 160 is located between the first brake pad 14 and the first pulley wheel 15 rather than between the first brake pad 14 and the first stationary spool 12*a* so that the old-to-new wire connection need not pass through the first brake pad 14 (as the brake pad 14 would have to be loosened to allow a deformable sheath wire connection to pass therethrough).

The connection device 160 is provided with two opposite clamp assemblies 161 and 162, which are able to bring the old first wire 11*a* into contact with the new first wire 11*b*, and to deform a sheath 171 around the two wires in the area where the wires are brought into contact. The sheath 171, once it has been deformed around the two wires, clamps the wires together to form a connection that allows the new first wire 11*b* to be drawn into the winder 8. As described, the operation of drawing in the new first wire 11*b* into the winder 8 can be accomplished by rotating the flyer 10 to bring the connection into a collector device, or, by manually pulling the old first wire 11*a* through the flyer 8 until the wire connection (e.g., sheath 171) is drawn beyond the flyer 10.

The first clamp assembly 161 is provided with a main carriage member 161' that may be translated in directions 162' and 162" by extending and retracting a piston rod 165 coupled to the main carriage member 161'. The piston rod 165 is preferably slidably coupled to an air cylinder (not shown) for controlling the position of the piston rod 165. The carriage member 161' is provided with a seat 164 that receives the old first wire 11*a*, and that cooperates with the second clamp assembly 162 to deform the sheath 171 around the old first wire 11*a* and the new first wire 11*b*, as will be fully described below. The carriage member 161' is also provided with a pressure arm 163 that may slide in direction 162' and 162" by means of a guide bar 163' supported in a longitudinal channel (not shown) of the carriage member 161'. The pressure arm 163 is biased toward the carriage member 161' and the old first wire 11*a* by a first pre-loaded spring 166 disposed between the carriage member 161' and the guide bar 163'.

Referring to FIG. 7A, the seat 164 extends vertically for the entire height of the carriage member 161', and is open at a top face 161*a*, a bottom face 161*b* and a left face 161*c* of carriage member 161' (FIG. 7B). The old first wire 11*a* runs in direction $d_1$ through the seat 164 during the winding operations of the winder 8 to reach tensioner T (FIG. 1). More particularly, the old first wire 11a is fed from the first wire spool 12a (FIG. 1), enters the seat 164 by passing through the opening in the bottom face 161b of the carriage member 161', and exits the seat 164 from the opening in the top face 161a of the carriage member 161' to reach tensioner T.

When the old first wire 11a is passing through the seat 164 during winding operations, the carriage member 161' is in the rightmost position as shown in FIG. 7A. In this carriage member position, the pressure arm 163 does not press against the wire 11a due to the abutment of the guide bar 163' against an abutment member 167. The first pre-loaded spring 166 maintains this abutment.

The second clamp assembly 162, located opposite the first clamp assembly 161, is provided with a stationary member 169 having a sheath seat 170 for receiving the sheath 171. The sheath seat 170 is a portion of a cylinder that extends vertically along the body of the stationary member 169, and that is open at a top face 169a, a bottom face 169b, and a right side 169c of the stationary member 169.

Figure 7C:
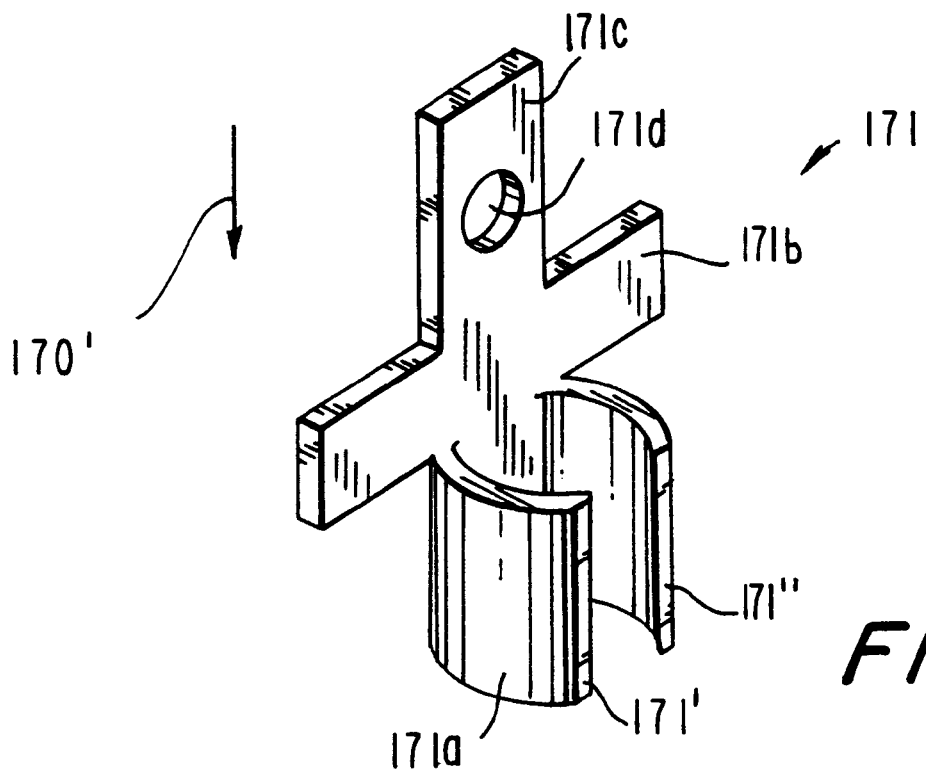
FIG. 7C is a perspective view of the deformable sheath of FIG. 7A taken along line 7C—7C.

In preparation for connecting the old first wire 11a and the new first wire 11b the sheath 171 is placed in the seat 170, and the new first wire 11b fed from the second spool 12b is aligned in the seat 170 (FIGS. 7A and 7B). As shown in FIG. 7C, the sheath 171 has a cylindrical portion 171a (having a first end 171' and a second end 171"), a horizontal portion 171b, and a upward extension 171c having a bore 171d. A first portion $P_1$ of the new first wire 11b is bent, and passed through the bore 171d of the sheath 171. The portion of the new first wire 11b below the stationary member 169 is placed between two adjacent turns of a second pre-loaded spring 172 to clamp the new wire. By passing the new first wire 11b through the bore 171d and by clamping it with the turns of the second pre-loaded spring 172, the new wire can be maintained in a vertical position in the seat 170 prior to and during the operations of forming a connection between the old first wire 11a and the new first wire 11b.

With reference to FIGS. 7B and 7C, the cylindrical portion 171a of the sheath 171 is the portion which seats in the seat 170 of the stationary member 169 and which deforms around the old first wire 11a and the new first wire 11b to form the wire connection. The horizontal portion 171b of the sheath 171 rests on the top face 169a of the stationary member 169 to maintain the sheath 171 seated in seat 170. The upward extension 171c of the sheath 171 can be used to grip the sheath 171 when the sheath 171 must be positioned in the seat 170. To position the sheath 171 in the seat 170, the cylindrical portion 171a of the sheath is lowered into the seat 170 from above, in direction 170', until the horizontal portion 171b abuts the top face 169a of the stationary member 169. The first and second ends 171' and 171" of the sheath 171 protrude from the seat 170 as shown in FIGS. 7A and 7B.

The stationary member 169 is also provided with a cutter member 173 supported by a guide bar 173" which can slide in a longitudinal channel of the stationary member 169. The cutter member 173 has a cutting edge 173' positioned just above the top face 169a of the stationary member 169 and aligned with the connection portion of the sheath 171 (i.e., between the horizontal portion 171b and the bottom of the cylindrical portion 171a of the sheath 171). A third pre-loaded spring 174 mounted between the stationary member 169 and an extension of guide bar 173" maintains the cutting edge 173' against the new first wire 11b as shown in FIGS. 7A and 7B. The new first wire 11b can be placed in the seat 170 by manually shifting the cutter member 173 to one side (e.g., in direction 162") in opposition to the bias of the third pre-loaded spring 174.

A blade 176 is also present below and in between the bottom faces 161b and 169b of the carriage member 161' and the stationary member 169 to cut the old first wire 11a (described below). The blade 176 can be translated from a rest position (shown as solid blade 176' in FIG. 7A) to a cutting position for cutting the old first wire 11a (shown as dashed blade 176" in FIG. 7A)

The operation to connect the old first wire 11a to the new first wire 11b requires inserting the sheath 171 into the seat 170 and placing the new first wire 11b in the seat 170 so that the new wire is held between the bore 171d and the second spring 172 (as shown in FIG. 7B). The blade 176 is then moved to the cutting position 176" for cutting the old first wire 11a, and the carriage member 161' is moved in direction 162' by extending the shaft 165. Right at the beginning of the movement of the carriage member 161', the pressure member 163 comes into contact with the old first wire 11a with a pressing action to maintain the old first wire 11a in seat 164. As the carriage member 161' continues to move in the direction 162', the pressure member 163 continues to press against the old first wire 11a due to the biasing action of the first pre-loaded spring 166, which is no longer impeded by the abutment member 167.

As the carriage member 161' moves in the direction 162', a second portion $P_2$ of the old first wire 11a encounters the blade 176. Continuing the movement of the carriage member 161' causes a shearing action of the old first wire 11a by a cutting edge 176a of the blade 176 (which meets a cutting edge 177 present on the bottom face 161b of the carriage member 161'). The movement of the carriage member 161' in direction 162' continues so that face 178 of the carriage member 161' abuts the front face 173'" of the cutting member 173.

Figure 7D:
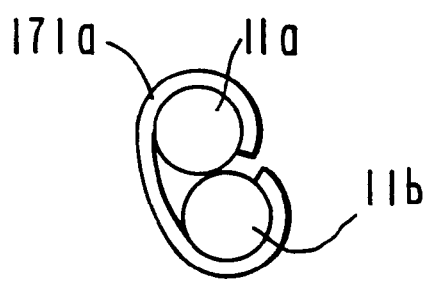
FIG. 7D is a top plan view of the deformable sheath of FIG. 7B taken along line 7D—7D.

The carriage member 161' continues to move in the direction 162' so that the cutting member 173 also moves in the direction 162' to cut the new first wire 11b, and, immediately afterwards, to shear away the horizontal portion 171b of the sheath 171. As this occurs, the front slanted portion 169' of the stationary member 169 enters the seat 164 and the old and new wires comes into contact. Further movement of the carriage member 161' in the direction 162' cause the surfaces 164a and 164b of the seat 164 to close the cylindrical portion 171a of the sheath 171 around the two wires. The resulting old-to-new wire connection is shown in FIG. 7D which is a top plan view of the old-to-new wire connection taken along line 7D—7D of FIG. 7B.

Following wire connection, the blade 176 is returned to its rest position 176' and the carriage member 161' starts to move back in the direction 162". The clamping action of the pressure arm 163 on the old first wire 11a maintains the old wire in the seat 164, and because the deformed sheath 171 has been slightly forced into the seat 164, the new first wire 11b is pulled away from the turns of second pre-loaded spring 172 by movement of the carriage member 161' in direction 162". The carriage member 161' continues to move in the direction 162" until it reaches the position shown in FIGS. 7A and 7B for supplying the old first wire 11a to the winder. Once this position is reached, the old first wire 11a is no longer pressed by the pressure arm 163 so the old first wire 11a together with the new first wire 11b can be drawn into the tensioner T and the rest of the winder 8. Prior to starting the winder 8, however, it may be desirable to ensure that the deformed sheath 171 is free from the seat 164 as the sheath 171 may become jammed against the surfaces 164a and 164b of the sheath during deformation. Extension pins (not shown), for instance, may be included within the carriage member 161' that extend through the surfaces 164a and 164b and press against the deformed sheath 171 to free it from the seat 164 prior to starting the winder 8.

As stated, the first brake pad 14 (FIG. 1) that cooperates with the tensioner T to maintain a wire correctly tensioned during winding has been placed below the carriage member 161' to avoid passing the deformed sheath 171 through the brake pad 14. This prevents the brake pad 14 from having to be adjusted (e.g., loosened) during wire change-over or wire replacement. (Note that the cutter 100 is not required when using the connection device 160 of FIGS. 7A–7D.)

A certain length of the old first wire 11a must exist between the bottom face 161b and the cutting edge 177 of the carriage member 161' to run upward into the seat 164 as the carriage member 161' moves toward its final leftmost position in FIGS. 7A and 7B (which is when the old and new wires are brought into contact and the sheath 171 is deformed). That is, because the tensioner T maintains tension on the portion of the old first wire 11a threaded through the tensioner T and the winder 8, the old wire, once cut, is drawn upward toward the seat 164 as the carriage member 161' moves in the direction 162'. Accordingly, a sufficient distance must exist between the location where the old wire is cut and the seat 164 to ensure that the old wire is not completely withdrawn from the seat 164 as the carriage member 161' moves toward the stationary member 169 once the old first wire 11a has been cut.

It will be understood that the foregoing is only illustrative of the principles of this invention, and that various modifications can be made by those skilled in the art without departing from the scope and spirit of the invention. For example, any type of collection device may be used to collect old first wire 11a and old second wire 11a'. These wires even may be collected manually if so desired. Further, other techniques (e.g., adhesives, welds, clamps, etc.) may be employed to couple old first wire 11a to new first wire 11b, and old second wire 11a' to new second wire 11b'. The invention is not limited in application to double flyer winders and may be used with other coil winders (e.g., single flyer winders and the like).

What is claimed is:

1. An apparatus for connecting an end of an old wire to an end of a new wire during wire change-over and wire replacement in a coil winder, the apparatus comprising:
    a deformable sheath configured to hold the end of the new wire prior to connection;
    a first member having a recess sized to hold the deformable sheath; and
    a second member having a seat for holding the end of the old wire, wherein the seat is shaped so that pressing the first and second members together causes the deformable sheath to enter the seat and to deform about the end of the old wire and the end of the new wire, forming a rigid connection therebetween.

2. The apparatus of claim 1 wherein the deformable sheath comprises a bore for receiving the end of the new wire so as to hold the new wire within the deformable sheath.

3. The apparatus of claim 1 wherein the deformable sheath comprises a cylindrical portion that deforms to couple the end of the new wire to the end of the old wire.

4. The apparatus of claim 1 wherein the deformable sheath comprises a horizontal portion sized to rest on a top surface of the first member so that the first member supports the deformable sheath during wire change-over and wire replacement.

5. The apparatus of claim 1 wherein the first member is a stationary member and wherein the second member is a mobile member, the mobile member moving toward and contacting with the stationary member during wire change-over and wire replacement to deform the sheath.

6. The apparatus of claim 1 further comprising a cutting mechanism for cutting the old wire to form the first end of the old wire during the formation of a new-to-old wire connection.

7. The apparatus of claim 6 wherein the cutting mechanism is configured to cut both a portion of the deformable sheath and the new wire during the formation of the new-to-old wire connection.

8. An apparatus for connecting an end of an old wire to an end of a new wire during wire change-over and wire replacement in a coil winder, the apparatus comprising:
    a deformable sheath;
    a first member having a recess sized to hold the deformable sheath; and
    a second member, wherein the end of the new wire and the end of the old wire are aligned between the first and second members prior to connection, and wherein the second member has a seat that is shaped so that pressing the first and second members together causes the deformable sheath to enter the seat and to deform about the end of the old wire and the end of the new wire, forming a rigid connection therebetween.

9. The apparatus of claim 8 wherein the deformable sheath comprises a bore for receiving the end of the new wire so as to hold the new wire within the deformable sheath.

10. The apparatus of claim 8 wherein the deformable sheath comprises a horizontal portion sized to rest on a top surface of the first member so that the first member supports the deformable sheath during wire change-over and wire replacement.

11. The apparatus of claim 8 wherein the first member is a stationary member and wherein the second member is a mobile member, the mobile member moving toward and contacting with the stationary member during wire change-over and wire replacement to deform the sheath.

12. The apparatus of claim 8 further comprising a first cutting mechanism for cutting the old wire to form the first end of the old wire during the formation of a new-to-old wire connection.

13. The apparatus of claim 12 further comprising a second cutting mechanism for cutting both a portion of the deformable sheath and the new wire during the formation of the new-to-old wire connection.

14. The apparatus of claim 8 wherein during operation of the coil winder the old wire passed between the first and second members.

15. The apparatus of claim 8 wherein the old wire has a given travel path during operating of the coil winder and wherein a result of forming the rigid connection between the end of the old wire and the end of the new wire is that the end of the new wire is aligned in the given travel path.

* * * * *